(12) United States Patent  
Park et al.

(10) Patent No.: US 9,374,258 B2  
(45) Date of Patent: Jun. 21, 2016

(54) METHOD FOR TRANSMITTING OR RECEIVING INTERFERENCE INFORMATION AND APPARATUS THEREFOR

(71) Applicant: LG Electronics Inc., Seoul (KR)

(72) Inventors: Hanjun Park, Seoul (KR); Hakseong Kim, Seoul (KR); Hanbyul Seo, Seoul (KR); Jonghyun Park, Seoul (KR); Kijun Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 14/274,376

(22) Filed: May 9, 2014

(65) Prior Publication Data

US 2014/0334403 A1 Nov. 13, 2014

Related U.S. Application Data

(60) Provisional application No. 61/821,733, filed on May 10, 2013.

(51) Int. Cl.
| | |
|---|---|
| *H04L 12/28* | (2006.01) |
| *H04L 25/08* | (2006.01) |
| *H04W 72/00* | (2009.01) |
| *H04L 27/26* | (2006.01) |
| *H04J 11/00* | (2006.01) |

(Continued)

(52) U.S. Cl.
CPC ............ *H04L 27/2647* (2013.01); *H04J 11/005* (2013.01); *H04L 5/001* (2013.01); *H04L 5/0023* (2013.01); *H04L 5/0048* (2013.01); *H04L 5/0073* (2013.01); *H04W 24/02* (2013.01)

(58) Field of Classification Search
CPC .... H04W 24/00; H04W 24/02; H04L 5/0053; H04L 5/001; H04L 5/0023; H04L 5/0048; H04L 5/0073; H04L 27/2647; Y02B 60/50; H04J 11/005
USPC ................. 370/277–295, 310–350, 431–463, 370/478–480, 498; 455/447–464; 375/254, 375/278, 284–285, 296, 346, 367
See application file for complete search history.

(56) References Cited

U.S. PATENT DOCUMENTS

| | | | | |
|---|---|---|---|---|
| 8,055,199 | B2 * | 11/2011 | Kim ...................... | H04B 7/024 455/63.1 |
| 8,447,310 | B2 * | 5/2013 | Yu ......................... | H04W 48/12 455/403 |
| 8,488,480 | B2 * | 7/2013 | Han ..................... | H04B 7/0417 370/252 |

(Continued)

*Primary Examiner* — Tri H Phan  
(74) *Attorney, Agent, or Firm* — Dentons US LLP

(57) ABSTRACT

A method for receiving information for interference cancellation of a mobile station (MS) is disclosed. The method is performed by the MS and includes receiving a restricted virtual radio network temporary identifier (V-RNTI) set including a plurality of V-RNTIs for interference signal cancellation from a serving base station (BS), wherein each of the plurality of V-RNTIs is associated with one or more RNTIs of one or more MSs served by a neighboring cell (hereinafter, "neighboring MS"), and receiving downlink control channel including a cyclic redundancy check (CRC) bit scrambled by at least one V-RNTI of the restricted V-RNTI set, for the neighboring MS, using the at least one V-RNTI, wherein, if two or more neighboring MSs having RNTIs associated with a specific V-RNTI among the plurality of V-RNTIs are scheduled at the same time, the specific V-RNTI is used only for downlink control channel for one of the two or more neighboring MSs.

14 Claims, 11 Drawing Sheets

(51) Int. Cl.
*H04W 24/02* (2009.01)
*H04L 5/00* (2006.01)

(56) References Cited

U.S. PATENT DOCUMENTS

| | | | | |
|---|---|---|---|---|
| 8,923,905 B2* | 12/2014 | Montojo | ................ | H04B 7/024 455/507 |
| 2007/0149242 A1* | 6/2007 | Kim | ...................... | H04J 11/004 455/525 |
| 2013/0077578 A1* | 3/2013 | Wang | ..................... | H04B 1/712 370/329 |
| 2013/0336193 A1* | 12/2013 | Luo | ........................ | H04W 16/14 370/312 |
| 2014/0018086 A1* | 1/2014 | Guo | ........................ | H04L 5/0048 455/450 |
| 2014/0036737 A1* | 2/2014 | Ekpenyong | ........... | H04W 8/245 370/280 |
| 2014/0293971 A1* | 10/2014 | Yoo | ...................... | H04W 56/003 370/336 |
| 2014/0376461 A1* | 12/2014 | Park | ...................... | H04W 16/14 370/329 |
| 2015/0245324 A1* | 8/2015 | Kim | .................... | H04W 72/042 370/329 |

* cited by examiner

METHOD FOR TRANSMITTING OR RECEIVING INTERFERENCE INFORMATION AND APPARATUS THEREFOR

Pursuant to 35 U.S.C. §119(e), this application claims the benefit of U.S. provisional application 61/821,733, filed on May 10, 2013, which is hereby incorporated by reference as if fully set forth herein.

TECHNICAL FIELD

The present invention relates to a wireless communication system and, more particularly, to a method for transmitting/receiving information for interference cancellation and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

The present invention is to provide a method for mitigating the influence of interference from a base station of a neighboring cell.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for receiving information for interference cancellation of a mobile station (MS), the method being performed by the MS and including receiving a restricted virtual radio network temporary identifier (V-RNTI) set including a plurality of V-RNTIs for interference signal cancellation from a serving base station (BS), wherein each of the plurality of V-RNTIs is associated with one or more RNTIs of one or more MSs served by a neighboring BS (hereinafter, "neighboring MS"), and receiving downlink control channel including a cyclic redundancy check (CRC) bit scrambled by at least one V-RNTI of the restricted V-RNTI set, for the neighboring MS, using the at least one V-RNTI, wherein, if two or more neighboring MSs having RNTIs associated with a specific V-RNTI among the plurality of V-RNTIs are scheduled at the same time, the specific V-RNTI is used only for downlink control channel for one of the two or more neighboring MSs.

Preferably, the method may further include detecting interference data caused by the neighboring cell, using information included in the received downlink control channel and cancelling the detected interference data from received data.

Preferably, the restricted V-RNTI set may be received through semi-static signaling.

Preferably, the restricted V-RNTI set may be BS-specific.

Preferably, the plurality of V-RNTIs of the restricted V-RNTI set may be configured such that a bit string representing one of the plurality of V-RNTIs has more than K different-value bits to be compared with other bit strings representing other V-RNTIs, where K is one or more integer.

In another aspect of the present invention, provided herein is a method for transmitting information for interference cancellation of a mobile station (MS), the method being performed by a base station (BS) and including configuring a restricted virtual radio network temporary identifier (V-RNTI) set including a plurality of V-RNTIs for interference signal cancellation, wherein each of the plurality of V-RNTIs is associated with one or more RNTIs of one or more serving MSs; transmitting the restricted V-RNTI set to a neighboring BS for transmission to a MS served by the neighboring BS; and transmitting downlink control channel including a cyclic redundancy check (CRC) bit scrambled by at least one V-RNTI of the restricted V-RNTI set, wherein, if two or more serving MSs having RNTIs associated with a specific V-RNTI among the plurality of V-RNTIs are scheduled at the same time, the specific V-RNTI is used only for downlink control channel for one of the two or more serving MSs.

Preferably, the restricted V-RNTI set may be BS-specific.

Preferably, the plurality of V-RNTIs of the restricted V-RNTI set may be configured such that a bit string representing one of the plurality of V-RNTIs has more than K different-value bits to be compared with other bit strings representing other V-RNTIs, where K is one or more integer.

Preferably, the method may further include indicating that the specific V-RNTI is used as an RNTI of the serving MS to the serving MS.

Preferably, the method may further include indicating blind decoding based on the specific V-RNTI or blind decoding based on a preconfigured cell (C)-RNTI of the serving MS to the serving MS.

In another aspect of the present invention, provided herein is a mobile station (MS) for receiving information for interference cancellation, the MS including a radio frequency (RF) unit and a processor configured to control the RF unit, wherein the processor is configured to receive a restricted virtual radio network temporary identifier (V-RNTI) set including a plurality of V-RNTIs for interference signal cancellation from a serving base station (BS), wherein each of the plurality of V-RNTIs is associated with one or more RNTI of one or more MSs served by a neighboring BS (hereinafter, "neighboring MS"), and receive downlink control channel including a cyclic redundancy check (CRC) bit scrambled by at least one V-RNTI of the restricted V-RNTI set, for the neighboring MS, using the at least one V-RNTI, and wherein, if two or more neighboring MSs having RNTIs associated with a specific V-RNTI among the plurality of V-RNTIs are scheduled at the same time, the specific V-RNTI is used only for downlink control channel for one of the two or more neighboring MSs. In another aspect of the present invention, provided herein a base station (BS) for transmitting information for interference cancellation, the BS including a radio frequency (RF) unit; and a processor configured to control the RF unit, wherein the processor is configured to configure a restricted virtual radio network temporary identifier (V-RNTI) set including a plurality of V-RNTIs for interference signal cancellation, wherein each of the plurality of V-RNTIs is associated with one or more RNTIs of one or more serving mobile stations (MSs), transmit the restricted V-RNTI set to a neighboring BS for transmission to a MS served by the neighboring BS, and transmit downlink control channel including a cyclic redundancy check (CRC) bit scrambled by at least one V-RNTI of the restricted V-RNTI set, and wherein, if two or more serving MSs having RNTIs associated with a specific V-RNTI among the plurality of V-RNTIs are scheduled at the same time, the specific V-RNTI is used only for downlink control channel for one of the two or more serving MSs.

The above technical solutions are merely some parts of the embodiments of the present invention and various embodiments into which the technical features of the present invention are incorporated can be derived and understood by persons skilled in the art from the following detailed description of the present invention.

Advantageous Effects

As is apparent from the above description, exemplary embodiments of the present invention can efficiently receive or transmit interference cancellation information in a downlink, such that interference cancellation can be conducted efficiently.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
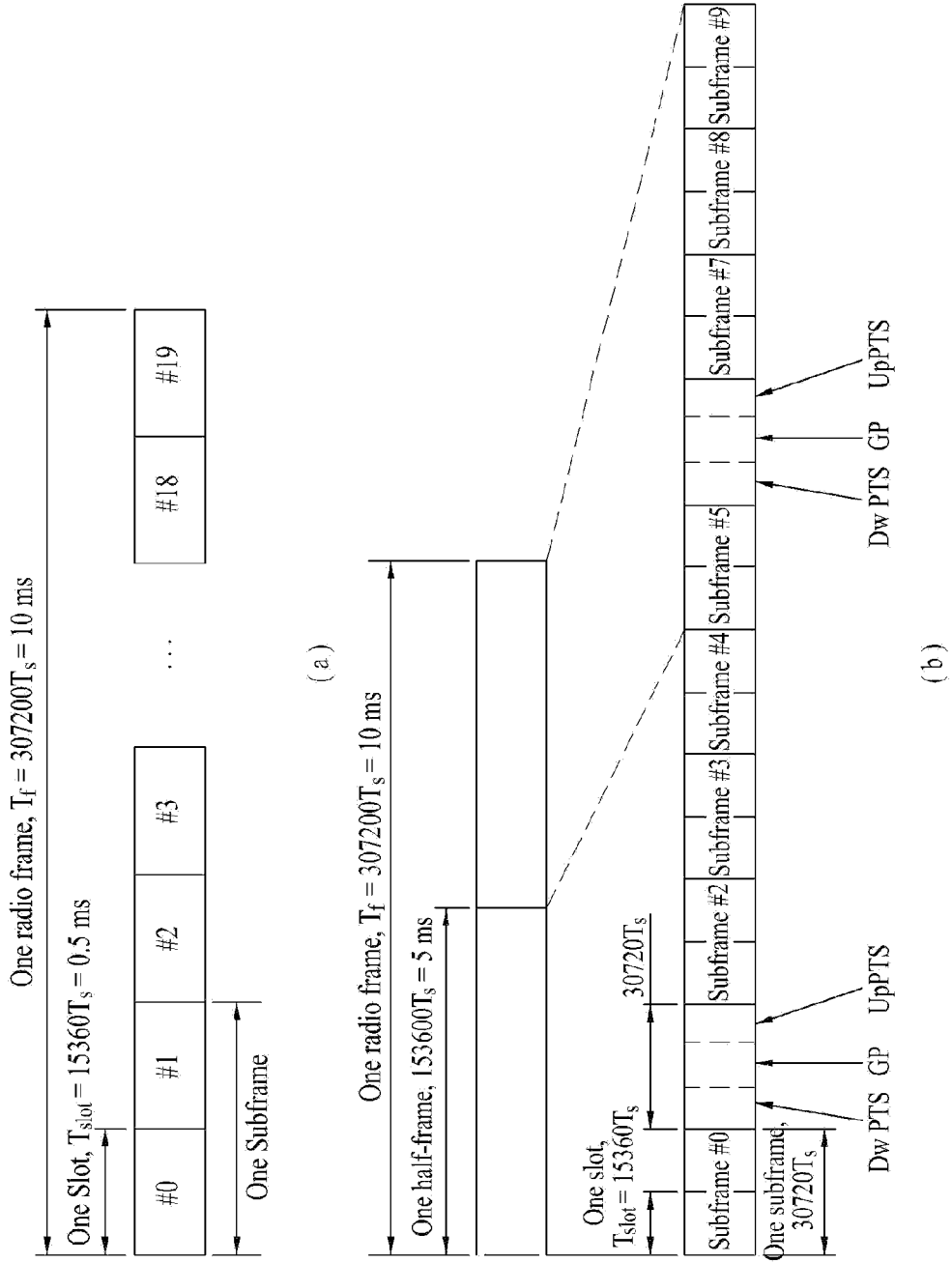
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource.

In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
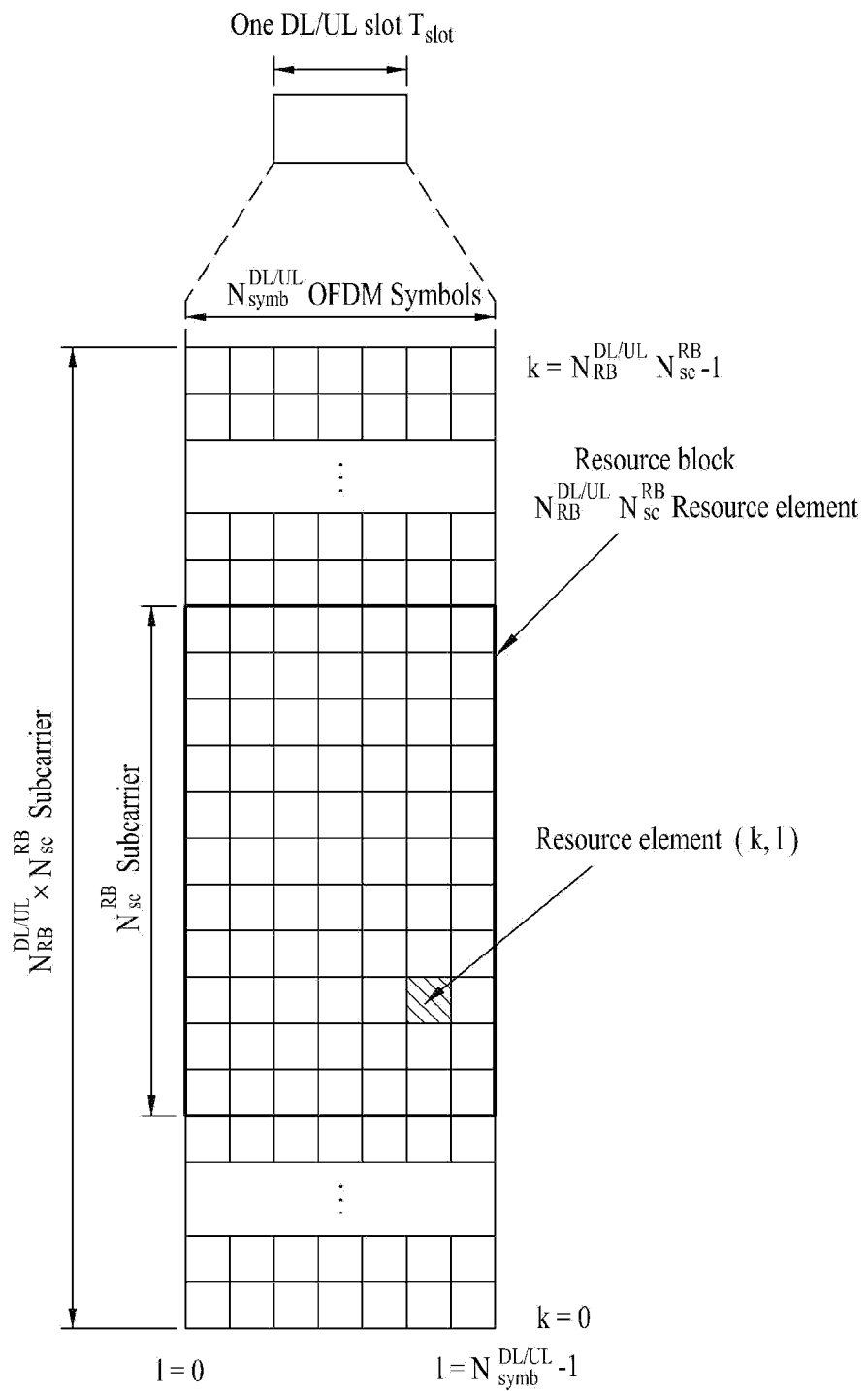
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy N sc consecutive subcarriers in a subframe and respectively disposed in two slots of the subframe are called a physical resource block (PRB) pair. Two RBs constituting a PRB pair have the same PRB number (or PRB index).

Figure 3:
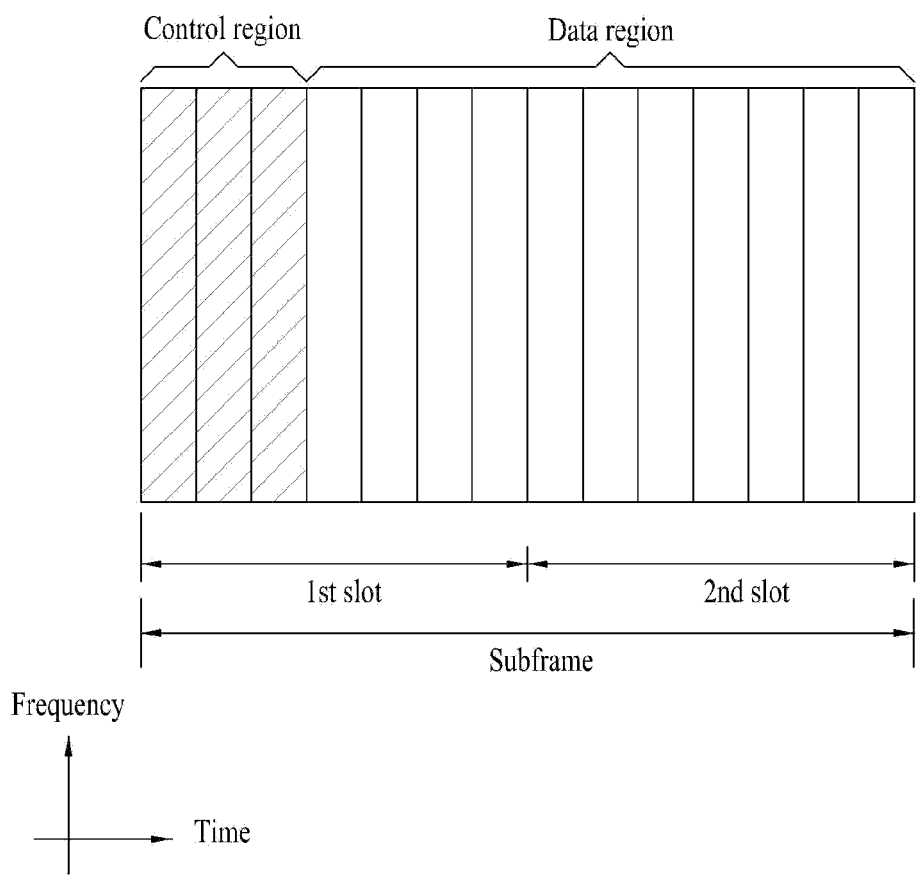
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
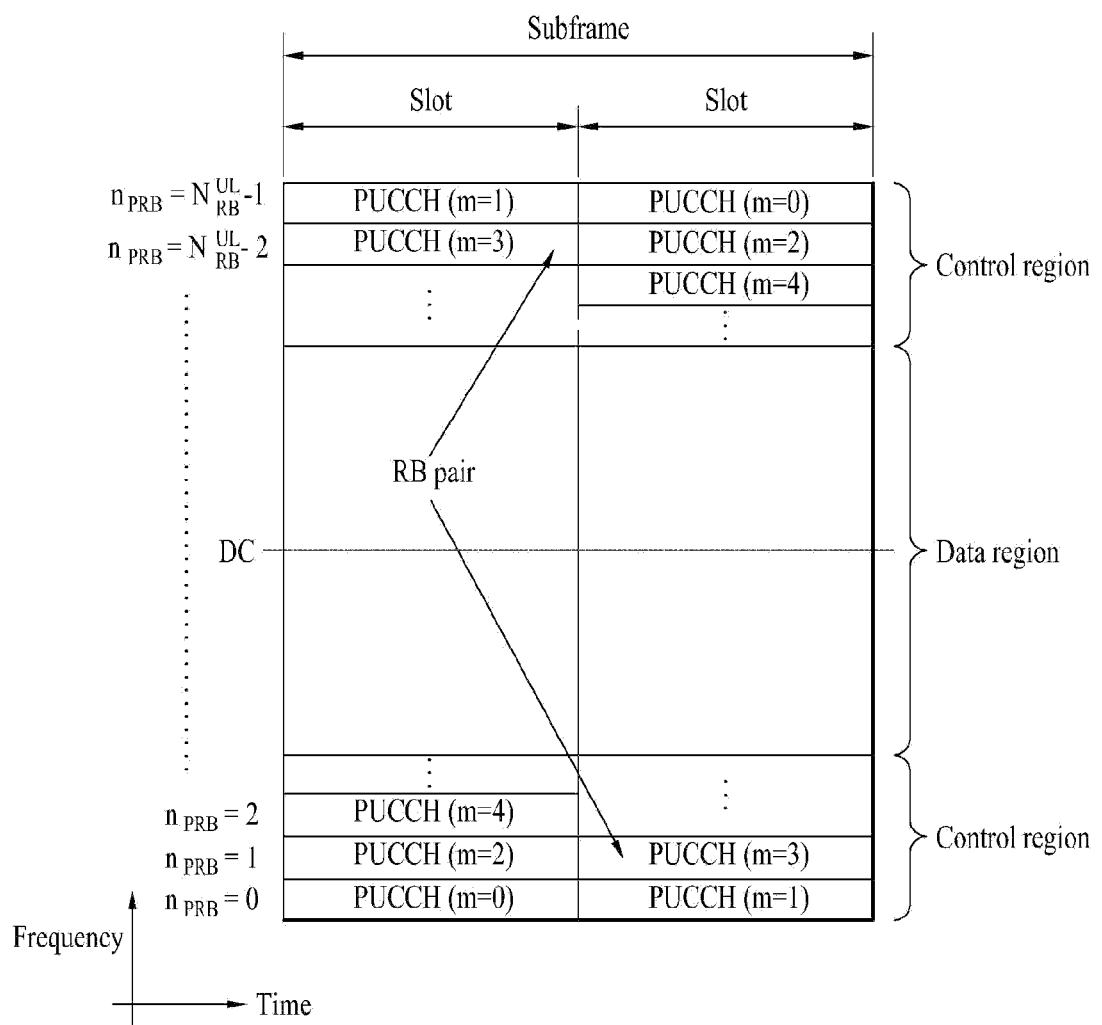
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

The present invention assumes a wireless communication system in which plural UEs served by a single eNB or transmission point are present and the UEs have respective UE IDs through which the UE can differentiate DCI transmitted thereto. In the wireless communication system, when a specific UE can apply an interference cancellation (IC) scheme through a decoding or demodulation procedure to interference data coming from a neighboring eNB or transmission point, a method for causing the UE supporting the IC scheme to use DCI regarding interference data is considered.

In the wireless communication system including an LTE system, an eNB transmits DCI, which is DL control information, to a PDCCH region in order to indicate resource assignment information of DL data, a modulation scheme, channel coding information, HARQ information, and power information, etc. to a UE receiving the DL data. In this case, the UE needs to ascertain which DCI is DCI belonging thereto and, for this, the eNB may be designed to transmit a UE ID together with DCI. As described above, in the LTE system, a 16-bit CRC is added to the DCI in order to determine whether DCI transmission is erroneous. In this case, UE-specific DCI is transmitted to a corresponding UE by scrambling the 16-bit CRC with an RNTI which is a UE ID. In the LTE system, a UE may receive DCI format 1A for fallback mode and a DCI format for supporting MIMO (e.g. DCI format 2C), according to transmission mode (TM) configured therefor and perform blind decoding (BD) with respect to the two types of DCI formats. The UE performs descrambling using an RNTI thereof with respect to every DCI and checks a CRC bit. If there are no errors as a result of checking the CRC bit, the UE determines that DCI belongs thereto. The RNTI means a cell (C)-RNTI of the LTE system and may be one of values except for a random access (RA)-RNTI allocated for random access.

Meanwhile, in an evolved wireless communication system such as LTE Release-12 etc., a network based IC scheme or network assisted (NA)-IC scheme for canceling interference data from a neighboring cell or a neighboring transmission point has been discussed. Upon performing the NA-IC scheme, a UE may use DCI regarding interference data coming into a data region thereof. For example, if the UE is aware of modulation information and information about a resource region to which interference data is transmitted within a data region thereof, the UE may more accurately perform interference data detection on a symbol basis and interference cancellation. In addition, if it is assumed that the UE supporting NA-IC performs codeword detection for interference data from a neighboring cell through sufficient hardware performance, DCI regarding interference data from the neighboring cell is indispensable. Accordingly, it is desirable for the UE supporting the NA-IC scheme to detect DCI regarding interference data from the neighboring cell. However, in a current LTE system, the interference data from the neighboring cell is data for another UE served by the neighboring cell (hereinafter, "neighboring cell UE") and a CRC bit can be checked only by a C-RNTI of the neighboring cell UE. Accordingly, when the UE detects DCI transmitted by the neighboring cell (hereinafter, "neighboring cell DCI") without checking a CRC according to the C-RNTI, since the neighboring cell DCI is used under the state in which determination as to whether the neighboring cell DCI has an error is not possible, reliability is lowered.

Figure 5:
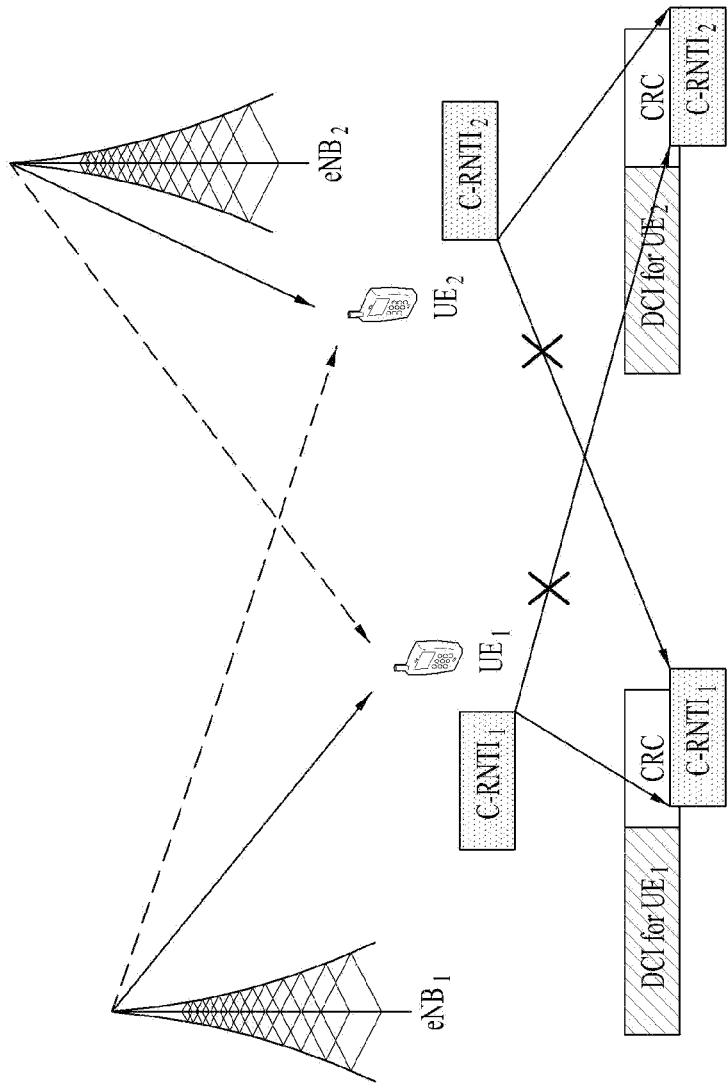
FIG. 5 shows inter-cell or inter-transmission point interferences in a wireless communication system according to one embodiment of the present invention.

FIG. 5 illustrates an example of the above problematic environment. It is assumed that two eNBs $eNB_1$ and $eNB_2$ are present, $eNB_1$ serves $UE_1$ and $eNB_2$ serves $UE_2$ and both UEs support an NA-IC scheme. In this case, a data signal transmitted by $eNB_2$ to $UE_2$ functions as interference (dotted lines from $eNB_2$ to $UE_1$) with respect to $UE_1$. $UE_1$ cannot perform descrambling of a CRC for corresponding DCI because information about $C-RNTI_2$ is not present even though it is desired to decode the DCI for $UE_2$ for the NA-IC scheme. Accordingly, even though $UE_1$ wishes to detect the DCI for $UE_2$ for the NA-IC scheme, since $UE_1$ cannot detect an error through a CRC bit cannot be detected, reliability is lowered.

One method for solving the above-mentioned problem is to inform a UE supporting an NA-IC scheme (hereinafter, "NA-IC UE") of C-RNTI information of neighboring cell UEs. However, UEs scheduled by a neighboring cell or a neighboring transmission point may be dynamically changed within a relatively short time. In this case, dynamic transmission of 16-bit C-RNTI information to the NA-IC UE according to scheduling change may generate excessive overhead and deteriorate system efficiency. Accordingly, the present invention proposes a method in which an eNB defines virtual RNTIs (V-RNTIs) that are to be allocated to scheduled UEs and actually scheduled UEs are semi-statically or dynamically assigned the V-RNTIs. In this case, the NA-IC UE may receive information about a V-RNTI set applicable as a UE ID in scheduling within a prescribed duration from a neighboring cell and apply an IC scheme for interference data based on a corresponding V-RNTI. Hereinafter, a detailed embodiment of the present invention will be described based on an LTE system.

According to a detailed description of the present invention, an eNB or a transmission point defines a V-RNTI set consisting of a plurality of virtual UE IDs and semi-statically informs an NA-IC UE of the V-RNTI set through a higher layer signal. To support an NA-IC scheme according to an embodiment of the present invention, it is preferable for an RNTI applied to DCI to have a more open property with respect to a neighboring cell UE so that the NA-IC UE may reliably detect DCI about interference data. Accordingly, the present invention proposes a method for an eNB or a transmission point to define a V-RNTI set including a relatively limited number of RNTIs for the purpose of distinguishing between only UEs scheduled by the eNB or transmission point, without using conventional C-RNTIs, with respect to RNTIs applied to a CRC added to DCI. This may reduce signaling overhead relative to the case in which an NA-IC UE is informed of C-RNTIs of scheduled UEs and may simultaneously raise efficiency because a UE of a neighboring cell that may affect interference on the NA-IC UE at the same time is a part of the scheduled UEs.

Then, a UE served by a corresponding eNB or transmission point is pre-assigned a specific V-RNTI in the V-RNTI set and determines whether data belongs thereto by descrambling the CRC added to the DCI with the V-RNTI. In addition, information about the V-RNTI set may be semi-statically indicated through a higher layer signal to the NA-IC UE served by a neighboring eNB or transmission point. In this case, upon detecting DCI regarding interference data, the NA-IC UE may perform an error detection procedure according to a CRC bit after performing descrambling with partial V-RNTIs or all V-RNTIs of the V-RNTI set.

The CRC error detection procedure is performed only on one V-RNTI set corresponding to one transmission point and, if there is no matched V-RNTI in the V-RNTI set, it may be recognized that DCI detection for interference data has failed. In this case, V-RNTIs in the V-RNTI set need to have sufficiently different values so that the V-RNTIs may not be incorrectly recognized by a decoding error. For example, the plurality of V-RNTIs of the restricted V-RNTI set may be configured such that a bit string representing one of the plurality of V-RNTIs has more than K different-value bits to be compared with other bit strings representing other V-RNTIs, where K is one or more integer.

Figure 6:
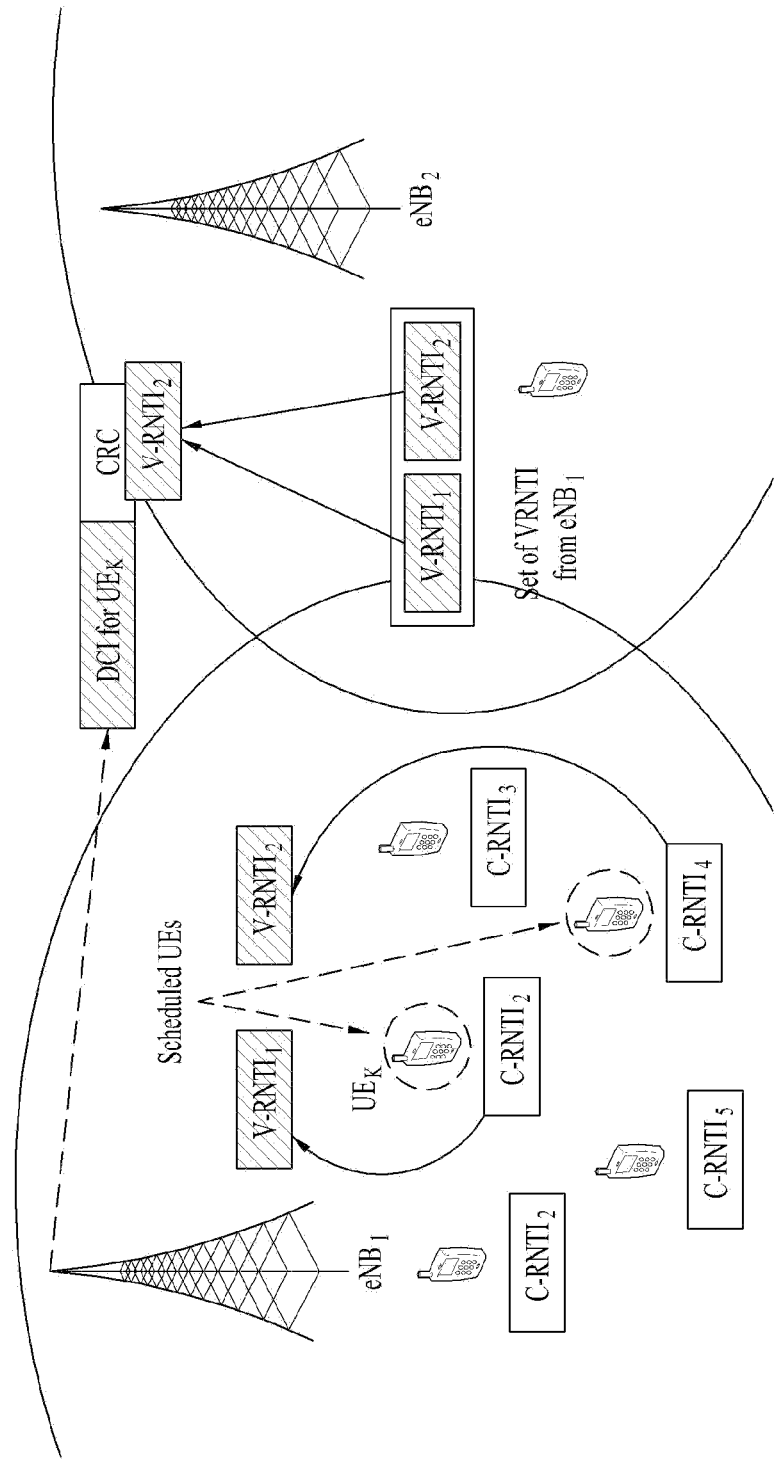
FIG. 6 is a diagram showing operation according to one embodiment of the present invention.

FIG. 6 conceptually illustrates the relationship between C-RNTIs and V-RNTIs. The relationship between the C-RNTIs and the V-RNTIs may be semi-statically or dynamically configured. In this case, only information about {V-RNTI1, V-RNTI2} is signaled to an NA-IC UE served by a neighboring eNB or a neighboring transmission point so that the NA-IC UE may perform error detection according to a CRC even with respect to DCI regarding interference data In the LTE system according to a detailed embodiment of the present invention, DCI is transmitted through a PDCCH region and resource units defined by a CCE are allocated for the DCI. In this case, a UE may infer an SS, which is the location of a CCE at which the DCI is transmitted, from a C-RNTI applied to the DCI and an aggregation level of the DCI. According to the embodiment of the present invention, if a V-RNTI is applied instead of the C-RNTI, a value of an RNTI applied to determine the SS should also be applied based on the V-RNTI and thus an NA-IC UE served by a neighboring cell may infer an SS for DCI of interference data from information about the V-RNTI. As an example, in the LTE system, if $N_{CCE,k}$ is the total number of CCEs of a k-th subframe and an aggregation level is L, CCEs corresponding to PDCCH candidate m of an SS for each serving cell in which a PDCCH is monitored may be defined as follows.

$$L\{(Y_k+m') \bmod \lfloor N_{CCE,k}/L \rfloor\}+1 \qquad \text{[Equation 1]}$$

$Y_k$ is defined by Equation 2, i is 0, ..., L−1, and m=m' for a common SS. If carrier aggregation is configured for the UE in a UE-specific SS, m'=m+$M^{(L)}·n_{CI}$ (where $n_{CI}$ is a carrier indicator field value); and if carrier aggregation is not configured for the UE, m'=m (where m=0, ..., $M^{(L)}$−1 and $M^{(L)}$ is the number of PDCCH candidates to be monitored in a given SS).

For a common SS, $Y_k$ is set to 9 at two aggregation levels of 4 and 8. For a UE-specific SS, $Y_k$ is defined as follows.

$$Y_k=(A·Y_{k-1}) \bmod D \qquad \text{[Equation 2]}$$

Here, $Y_{-1}=n_{RNTI}\neq 0$, A=39827, D=65537, k=$\lfloor n_s/2 \rfloor$, and ns is a slot number in a radio frame.

If a V-RNTI according to an embodiment of the present invention is applied, the V-RNTI may be applied to $n_{RNTI}$. Accordingly, a UE may broadly perform one of the following two operations for a specific DCI format supporting the V-RNTI.

Operation 1-1: BD is performed twice with respect to an SS indicated by a C-RNTI and an SS indicated by a V-RNTI.

Operation 1-2: BD is performed only with respect to the V-RNTI.

In Operation 1-1, since the number of BD procedures that should be performed by the UE increases, complexity of operations of the UE may increase. In LTE, functions supported by the UE are specified through UE capability items. In the present invention, there are a UE class supporting both Operations 1-1 and 1-2 and a UE class supporting only Operation 1-2.

Meanwhile, in LTE, a C-RNTI is always used to select an antenna port of a localized enhanced PDCCH (EPDCCH) as follows.

For the localized EPDCCH, a single antenna port p to be used is given by the following table using Equation 3.

$$n' = n_{ECCE,low} \bmod N_{RB}^{ECCE} + n_{RNTI} \bmod \min(N_{EPDCCH}^{ECCE}, N_{RB}^{ECCE})$$ [Equation 3]

TABLE 4

| n' | Normal cyclic prefix | | Extended cyclic prefix |
| --- | --- | --- | --- |
| | Normal subframes, Special subframes, configurations 3, 4, 8 | Special subframes, configurations 1, 2, 6, 7, 9 | All subframes |
| 0 | 107 | 107 | 107 |
| 1 | 108 | 109 | 108 |
| 2 | 109 | — | — |
| 3 | 110 | — | — |

In Table 4, $n_{ECCE,low}$ is the lowest ECCE index used by a corresponding EPDCCH in an EPDCCH set, $n_{RNTI}$ is a C-RNTI, and $N_{EPDCCH}^{ECCE}$ is the number of ECCEs used for the EPDCCH.

For distributed transmission, each RE in an enhanced REG (EREG) is associated with one of two antenna ports in an alternating manner, starting with antenna port 107, where p∈{107,109} for a normal CP and p∈{107,108} for an extended CP.

If a V-RNTI is introduced according to an embodiment of the present invention, the V-RNTI may be applied even to the $n_{RNTI}$ value. Meanwhile, as a C-RNTI is changed to the V-RNTI, an antenna port referred to for channel estimation is also changed and a PUCCH resource index for HARQ ACK-NACK may also be changed. However, although it is desirable that information about the antenna port conform to the V-RNTI so that an NA-IC UE refers to the information, a PUCCH resource index for the HARQ ACK-NACK is not helpful for the NA-IC UE to perform IC. Hence, the NA-IC UE may be configured such that antenna port mapping information referred to for channel estimation conforms to a value of the V-RNTI and the PUCCH resource index for the HARQ ACK-NACK conforms to an antenna port value in the case of applying a conventional C-RNTI value.

In the LTE system, a CCE includes 9 REGs and REG-to-resource mapping is designed to be shifted according to a cell ID. In the LTE system, REG mapping should be cyclically shifted such that four blocks $w^{(p)}(0), \ldots, w^{(p)}(M_{quad}-1)$ become $\overline{w}^{(p)}(0), \ldots, \overline{w}^{(p)}(M_{quad}-1)$ wherein $\overline{w}^{(p)}(i) = w^{(p)}((i+N_{ID}^{cell}) \bmod M_{quad})$. That is, REG mapping is cyclically shifted according to a cell ID $N_{ID}^{cell}$.

Accordingly, when an NA-IC UE in a neighboring cell recognizes an SS for DCI of interference data in a PDCCH region through information about a V-RNTI and attempts to detect the DCI, if IDs of two cells are different, REG mapping becomes different even though the SS is configured according to the V-RNTI. Then, actual resource regions for SSs of the two cells are not equal, thereby having difficulty in applying an NA-IC scheme. Therefore, in an embodiment of the present invention, the following two operations may be considered.

Operation 2-1: Only an NA-IC scheme of cells having the same physical cell ID is supported.

Operation 2-2: To support the NA-IC scheme, a physical cell ID used for REG mapping is switched to a virtual cell ID (e.g. $N_{ID}^{virtual}$) (i.e. $\overline{w}^{(p)}(i) = w^{(p)}((i+N_{ID}^{virtual}) \bmod M_{quad})$) and information about the virtual cell ID is exchanged between cells.

Hereinafter, a method for semi-statically or dynamically replacing a C-RNTI with a V-RNTI will be described.

A. Method for Semi-Statically Mapping C-RNTIs and V-RNTIs

According to a detailed embodiment of the present invention, an eNB or a transmission point may define a V-RNTI set by a virtual UE ID set and allocate a V-RNTI as a UE ID by semi-statically informing a specific UE, through a higher layer signal, of a specific V-RNTI in the V-RNTI set to be used instead of a C-RNTI. When configuring V-RNTIs as UE IDs to be actually scheduled according to this embodiment, a corresponding UE should receive information indicating that a V-RNTI has been used instead of a C-RNTI thereof from an eNB. Simply, a method in which an eNB configures a V-RNTI for a UE through a higher layer signal such as a radio resource control (RRC) signal may be considered. That is, a specific UE includes a V-RNTI in addition to a C-RNTI thereof as an additional ID and the eNB may command the UE through an additional higher layer signal to distinguish data of the UE only using the V-RNTI or using both the C-RNTI of the UE and the V-RNTI, after the V-RNTI is configured for the UE. As a detailed example, assuming that V-RNTIs are applied to M UEs when the eNB can manage N UEs (where N is greater than M), the eNB may pre-configure M V-RNTIs and map N C-RNTIs according to the N UEs to one of the M V-RNTIs.

Figure 7:
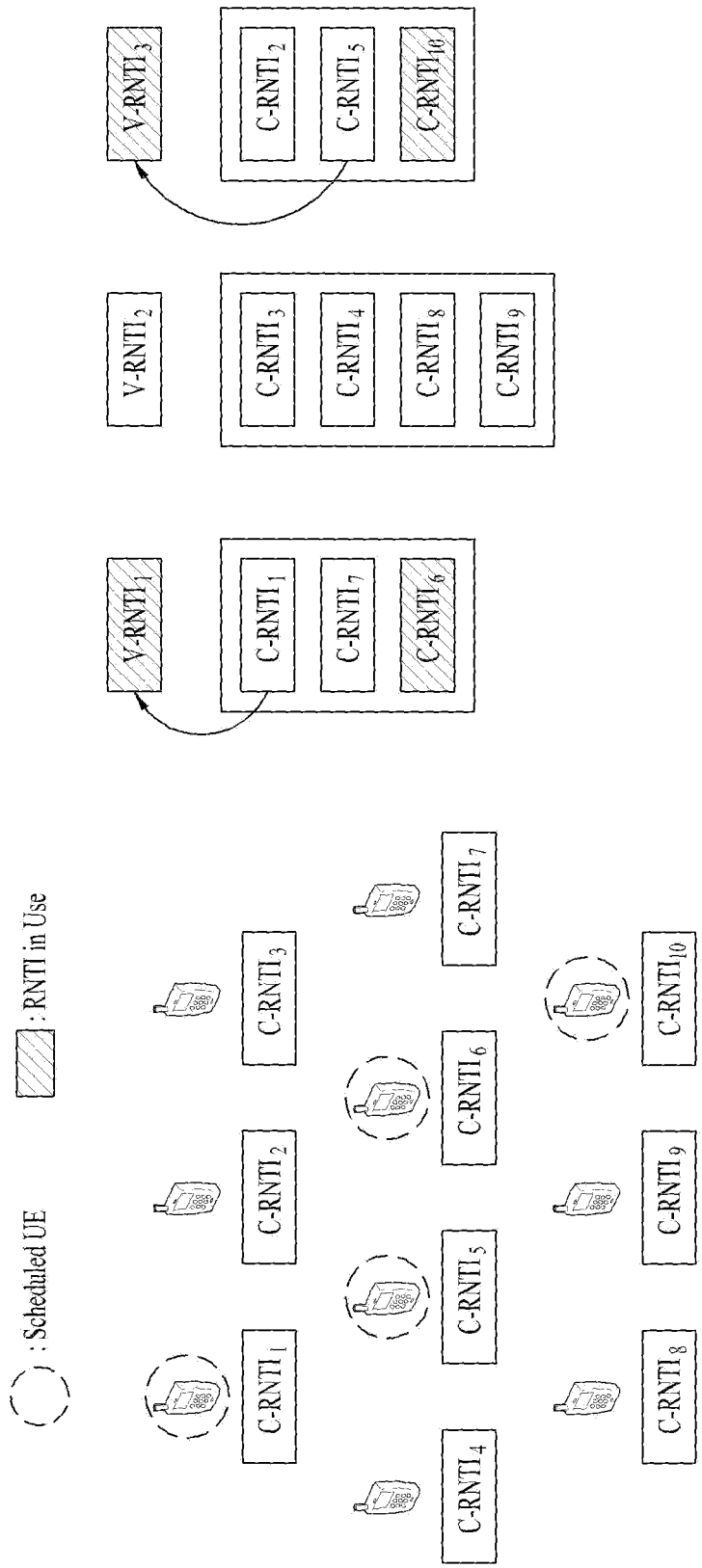
FIG. 7 shows relationship between cell-radio network temporary identity (C-RNTI) and virtual-RNTI according to one embodiment of the present invention.

FIG. 7 illustrates an example in which N=10 and M=3. Here, when UEs having C-RNTIs configured to be mapped to the same V-RNTI are simultaneously scheduled, only one C-RNTI of a corresponding group may be replaced with the V-RNTI and the other C-RNTIs may be maintained without being replaced with the V-RNTI. In this case, the number of C-RNTIs semi-statically corresponding to one V-RNTI may be one or more. The above method for semi-statically configuring a V-RNTI set for a specific UE through a higher layer signal may be used to reduce signaling load for V-RNTIs when the V-RNTIs are dynamically configured.

B. Method for Dynamically Mapping C-RNTIs and V-RNTIs

Figure 8:
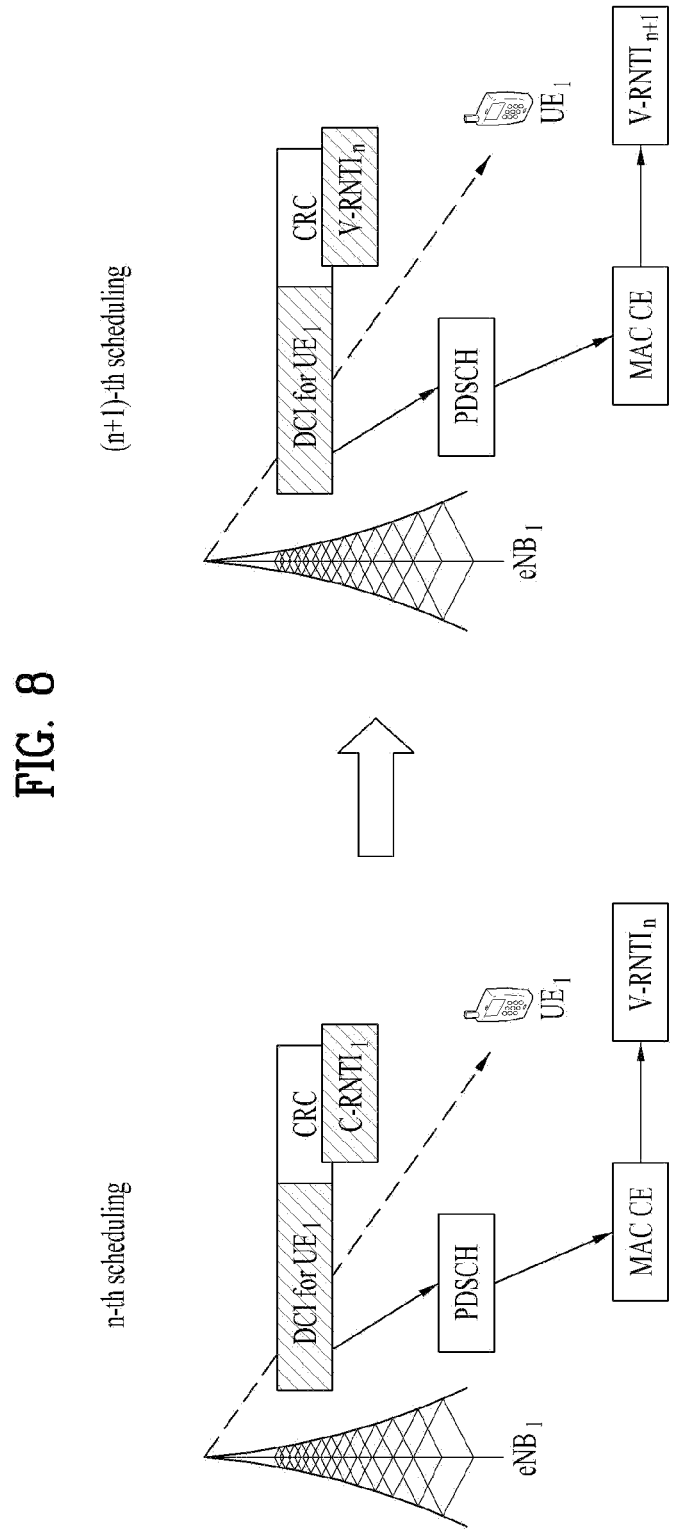
FIG. 8 is a diagram showing operation according to one embodiment of the present invention.

According to a detailed embodiment of the present invention, a method is proposed in which an eNB or a transmission point defines a V-RNTI set by a virtual UE ID set and allocate a V-RNTI as a UE ID by dynamically informing a specific UE, through a signal of a medium access control (MAC) stage, of a specific V-RNTI in the V-RNTI set to be used instead of a C-RNTI. In the LTE system, an eNB may inform a specific UE of a control signal through a MAC control element (CE) in a MAC region. The MAC CE is used to indicate information including a buffer status, a C-RNTI, discontinuous reception (DRX), timing advance (TA), power headroom, etc. According to an embodiment of the present invention, if an eNB desires to dynamically allocate a V-RNTI allocated currently thereby to a specific UE instead of a C-RNTI, a method for dynamically changing an RNTI value by transmitting a MAC CE associated with the C-RNTI to the UE may be considered. In this case, the eNB may transmit DCI scrambled with a C-RNTI of the UE at a first scheduling time and configure a V-RNTI instead of the C-RNTI at the next scheduling time upon receiving the V-RNTI on a MAC CE after the UE receives data in a PDSCH region. FIG. 8 illustrates an example in which a UE acquires V-RNTIn through a MAC CE received at an n-th scheduling time, receives DCI scrambled with V-RNTIn at an (n+1)-th scheduling time, and acquires V-RNTIn+1 through a MAC CE received using the DCI.

In the LTE system, the C-RNTI MAC CE is transmitted in message 3 (Msg3) in a random access (RA) procedure and is generally unchanged while the UE maintains an RRC connected state. Accordingly, to support an embodiment of the present invention, the eNB needs to configure the UE through a higher layer signal such as an RRC signal such that the UE continues to monitor the C-RNTI MAC CE even in a non-RA procedure. For example, the UE may be configured through a higher layer signal such as RNTI MAC CE on/off to recognize that a C-RNTI thereof can be dynamically changed without a cell reselection procedure.

Figure 9:
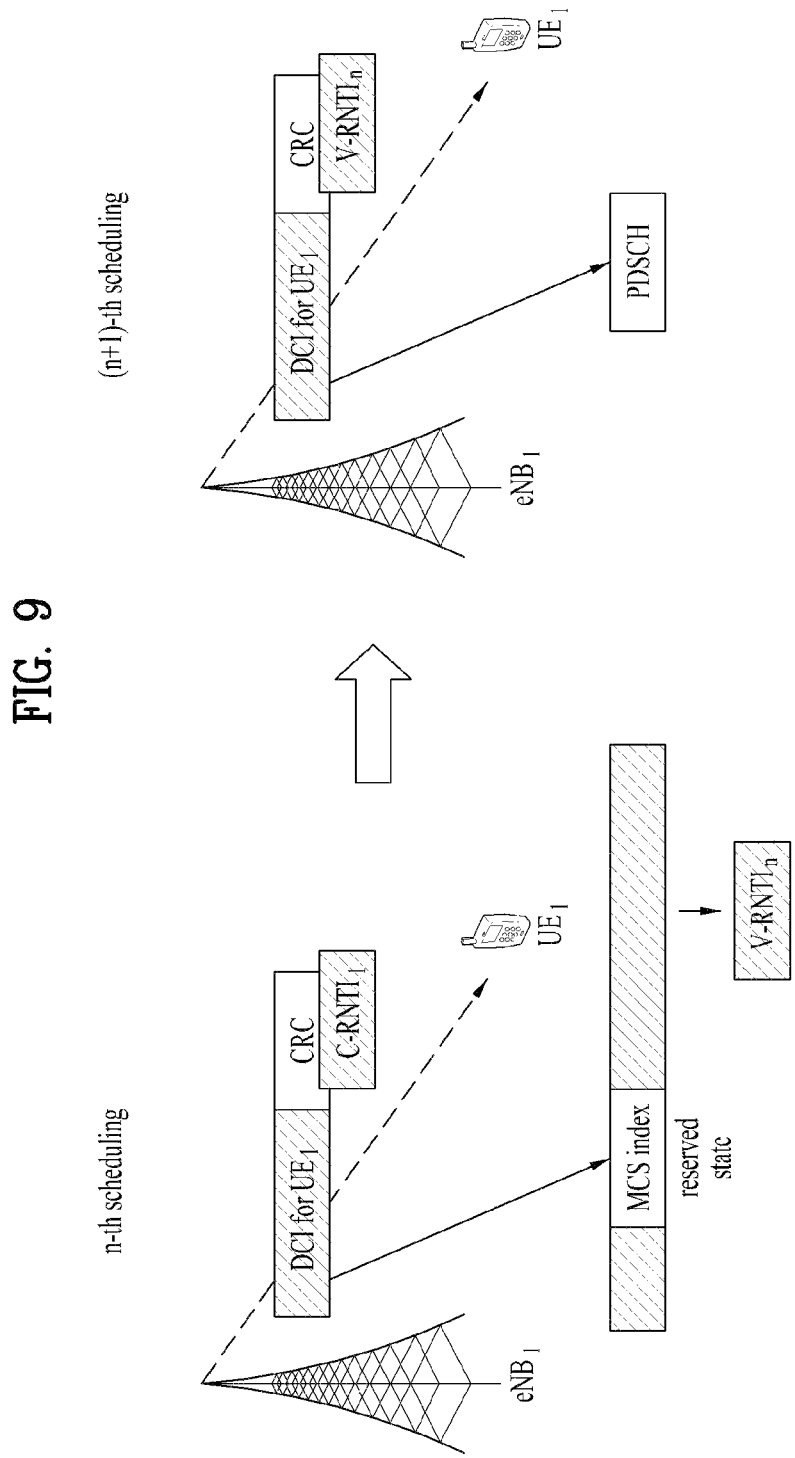
FIG. 9 is a diagram showing operation according to one embodiment of the present invention.

According to a detailed embodiment of the present invention, an eNB or a transmission point may define a V-RNTI set by a virtual UE ID set and allocate a V-RNTI as a UE ID by dynamically informing a specific UE, using DCI, of a specific V-RNTI to be used instead of a C-RNTI. In the LTE system, DCI of a PDCCH may be used for a purpose other than actual data transmission. For example, to perform semi-persistent scheduling (SPS), the eNB may transmit an indication about SPS activation/deactivation through DCI having a CRC to which an SPS-RNTI is applied to a PDCCH region. Similarly, the eNB may dynamically inform a specific UE, through the DCI, of a specific V-RNTI to be used instead of a C-RNTI. More specifically, if one of 29 to 31 is assigned as a value of an MCS related field of a DCI, the UE may assume that there is no data transmission. In the above environment, the UE may recognize that 16 sequential bits, except for the MCS related field and the other fields of the DCI, indicate a specific V-RNTI value. In the illustrated example of FIG. 9, when a partial field of DCI received at an n-th scheduling time has a specific value, a UE acquires a V-RNTI corresponding to a sequential bit sequence by disregarding a predefined DCI field and receives a PDSCH by receiving DCI scrambled with the acquired V-RNTI at an (n+1)-th scheduling time.

Alternatively, instead of indicating a specific 16-bit V-RNTI, the eNB may dynamically inform a specific UE of a specific V-RNTI within a V-RNTI set, instead of a C-RNTI, through a partial bit field of DCI. For example, if it is assumed that N V-RNTIs form one set, log 2(N) fields may be added to the DCI to indicate one of the N V-RNTIs or an unused DCI field among conventional DCI fields may be employed to indicate the V-RNTI. As an example of the second case, if a UE is limited to receive only one transport block (TB), DCI fields such as an MCS, an NDI, an RV, etc. of the other second TB may be used to indicate one V-RNTI of the V-RNTI set. In this case, if a UE having capable of performing BD twice with respect to a V-RNTI and a C-RNTI receives C-RNTI based DCI after a V-RNTI is configured with respect to a specific DCI format (e.g. DCI format 2C or 2D), the UE judges that the V-RNTI has been retrieved by the eNB and, thereafter, does not attempt to detect DCI based on the V-RNTI.

According to a detailed embodiment of the present invention, when an eNB or a transmission point defines a V-RNTI set by a virtual UE ID set and allocates a V-RNTI as a UE ID by dynamically informing a specific UE, using DCI, of a specific V-RNTI to be used instead of a C-RNTI, the V-RNTI may be independently applied on a DCI format basis. In the LTE system, a TM is configured for the UE and the TM generally has two DCI formats, that is, DCI format 1A for fallback mode and a DCI format (e.g. DCI format 2C or 2D) for MIMO operation. To support the fallback mode of DCI format 1A, it may be desirable to maintain a C-RNTI as an ID for corresponding DCI. Hence, a method in which a C-RNTI is applied to DCI format 1A and a V-RNTI is applied to a DCI format for MIMO operation, such as DCI format 2D, may be considered. In this case, if DCI according to DCI format 1A is detected after the V-RNTI is configured for the UE, the UE judges that the preconfigured V-RNTI has been retrieved by an eNB and judges that an RNTI in a DCI format (e.g. DCI format 2D) for MIMO operation has been changed to a C-RNTI after that time. In addition, if RNTIs differ according to DCI formats, an SS based on a different RNTI value per DCI format is applied according to the operation of the present invention. For example, in DCI format 1A, a C-RNTI may be applied to an SS as the $n_{RNTI}$ value of Equation 2 in DCI format 1A and a V-RNTI may be applied as the $n_{RNTI}$ value in DCI format 2C or 2D.

According to another embodiment of the present invention, when an eNB or a transmission point defines a V-RNTI set by a virtual UE ID set, a V-RNTI may have a unique value determined by a resource assignment scheme, a cell ID of the eNB or the transmission point, and a specific field of DCI and the UE may recognize the V-RNTI indicated by information about the resource assignment scheme, the cell ID of the eNB or the transmission point, and the specific field of the DCI at a previous scheduling time as a UE ID so as to attempt detection with respect to the V-RNTI in a PDCCH region at the next scheduling time.

According to operation capabilities of the UE, a method for configuring an ID set {C-RNTI, V-RNTI} by recognizing the V-RNTI as the second UE ID and performing detection with respect to all RNTIs in the ID set at the next scheduling time may also be considered.

In an embodiment of the present invention, the transmission point or the eNB may determine a specific V-RNTI value according to a resource assignment scheme in the frequency domain, a cell ID of the eNB or the transmission point, and a specific field value of the DCI. The UE may recognize a V-RNTI value at a subsequent time with reference to the resource assignment scheme in the frequency domain, the cell ID of the eNB or the transmission point, and the specific field value of the DCI at a previous scheduling time. The UE may also identify data thereof through the V-RNTI according to previous scheduling information. Alternatively, according to UE capabilities, the UE has an RNTI set {C-RNTI, V-RNTI} of two RNTIs including a C-RNTI and the V-RNTI according to the previous scheduling information. After performing DB in an SS according to each RNTI, the UE may identify data to which the V-RNTI is applied by checking a CRC for the C-RNTI and the V-RNTI. In this case, the specific field of the DCI may additionally use scrambling ID or scrambling ID and layer information in an environment in which the same eNB or transmission point schedules a plurality of UEs according to MU-MIMO by the same resource assignment scheme so that the V-RNTI may be divided into up to 4 V-RNTIs. That is, even by the same frequency resource assignment scheme, one of V-RNTI1, V-RNTI2, V-RNTI3, and V-RNTI4 may be indicated according to an SID value (e.g. 0 or 1) and an antenna port number (e.g. port 7 or 8).

A method is proposed in which information about the resource assignment scheme in the frequency region, the cell ID of the eNB or transmission point, and the specific field value of the DCI, which are described in the immediately previous paragraph is semi-statically transmitted to an NA-IC UE through a higher layer signal. According to an embodiment of the present invention, when an actually scheduled UE has a V-RNTI according to a combination of the resource assignment scheme in the frequency domain, the ID of the eNB or transmission point, and the specific field value of the DCI from previously scheduled DCI, if a UE that is subject to interference from the data indicated by the DCI is aware of information about the mapping relationship between the frequency resource assignment scheme of the actually scheduled UE and the V-RNTI, the UE can recognize a V-RNTI having the severest influence on data received thereby. Accordingly, the present invention proposes a method for informing a UE that is subject to interference, that is, an NA-IC UE, of information about the mapping relationship between the V-RNTI and the resource assignment scheme in the frequency domain, the cell ID of the eNB or the transmission point, and the specific field of the DCI.

Figure 10:
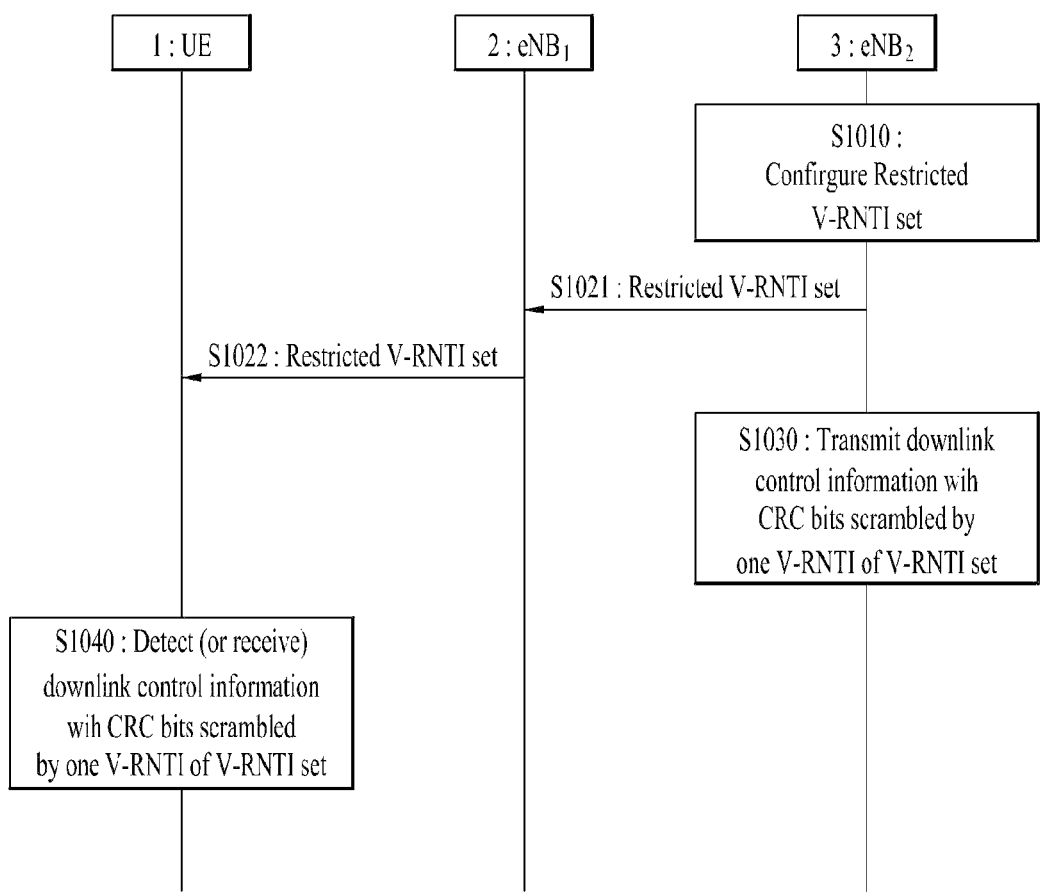
FIG. 10 is a diagram showing operation according to one embodiment of the present invention.

FIG. 10 illustrates an operation according to an embodiment of the present invention. A wireless communication system according to an embodiment of the present invention includes a UE(1), a serving eNB $eNB_1(2)$ of the UE, and an eNB $eNB_2(3)$ of a neighboring cell and may include more entities.

$eNB_2(3)$ may transmit information for interference cancellation of a UE and transmit data that is a cause of the interference to a UE served thereby. $eNB_2(3)$ may configure a restricted V-RNTI set including a plurality of V-RNTIs for interference cancellation (S1010). Each of the V-RNTIs may be associated with an RNTI of at least one serving UE and, thus, C-RNTIs of multiple serving UEs may correspond to one V-RNTI.

$eNB_2(3)$ may transmit the restricted V-RNTI set to $eNB_1(2)$ for transmission to UE(1) served by $eNB_1(2)$ (S1021). Transmission of the restricted V-RNTI set may be performed through a backhaul link between eNBs. $eNB_1(2)$ may transmit the restricted V-RNTI set to UE(1) served thereby (S1022). The restricted V-RNTI set may be transmitted to UE(1) through a semi-static scheme, e.g. higher layer signaling.

$eNB_2(3)$ may transmit DCI including a CRC bit scrambled with at least one V-RNTI of the restricted V-RNTI set (S1030). S1030 may be performed at the same time as S1021 or after S1021.

Meanwhile, if $eNB_2(3)$ schedules two or more serving UEs having RNTIs associated with a specific V-RNTI among the plural V-RNTIs at the same time, the specific V-RNTI may be used only for DCI transmission for one of the two or more serving UEs.

Although the DCI is for a specific UE served by $eNB_2(3)$, the DCI may serve as interference with respect to UE(1) served by $eNB_1(2)$ adjacent to $eNB_2(3)$. Accordingly, UE(1) may detect or receive the DCI including a CRC bit scrambled with at least one V-RNTI, using at least one V-RNTI of the restricted V-RNTI set received in step S1022 (S1040).

Thereafter, UE(1) may detect interference data caused by the neighboring cell using the received DCI and cancel the detected interference data detected from data received at a detection time of the interference data (e.g. the same subframe).

Further, the plurality of V-RNTIs of the restricted V-RNTI set may be configured such that a bit string representing one of the plurality of V-RNTIs has more than K different-value bits to be compared with other bit strings representing other V-RNTIs, where K is one or more integer.

Meanwhile, the embodiment related to FIG. 10 may alternatively or additionally include at least a part of the above-described embodiment(s).

Figure 11:
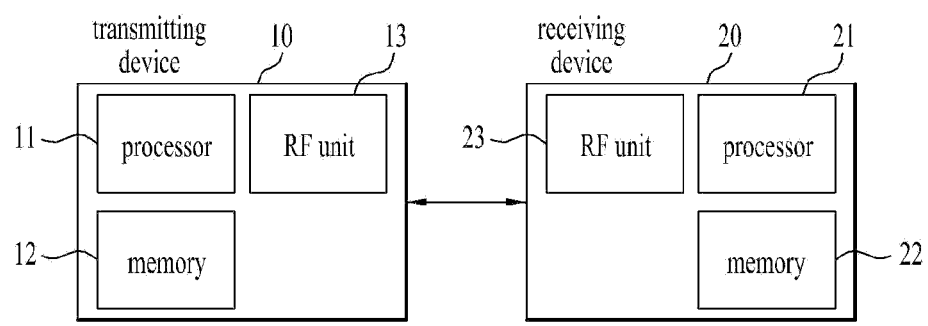
FIG. 11 is a block diagram of an apparatus for implementing embodiment(s) of the present invention.

FIG. 11 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), relay, or base station (BS).

The invention claimed is:

1. A method for receiving information for interference cancellation of a mobile station (MS), the method being performed by the MS and comprising:
receiving a restricted virtual radio network temporary identifier (V-RNTI) set including a plurality of V-RNTIs for interference signal cancellation from a serving base station (BS), wherein each of the plurality of V-RNTIs is associated with one or more MSs served by a neighboring BS (hereinafter, "neighboring MSs"); and
receiving, from the neighboring BS, a first downlink control channel for a first neighboring MS and a second downlink control channel for a second neighboring MS in a subframe,
wherein, if the first and second neighboring MSs are associated with a specific V-RNTI among the plurality of V-RNTIs, only the first downlink control channel includes a single cyclic redundancy check (CRC) bit scrambled by the specific V-RNTI.

2. The method according to claim 1, wherein, if the first and second neighboring MSs are associated with the specific V-RNTI, the second downlink control channel includes a single CRC bit scrambled by a RNTI of the second neighboring MS.

3. The method according to claim 1, wherein the restricted V-RNTI set is received through semi-static signaling.

4. The method according to claim 1, wherein, if the first neighboring MS is associated with a first V-RNTI and the second neighboring MS is associated with a second V-RNTI, the first V-RNTI and the second V-RNTI being included in the plurality of V-RNTIs, the first downlink control channel includes a single CRC bit scrambled by the first V-RNTI and the second downlink control channel includes a single CRC bit scrambled by the second V-RNTI.

5. The method according to claim 1, wherein the restricted V-RNTI set is BS-specific.

6. The method according to claim 1, wherein the plurality of V-RNTIs of the restricted V-RNTI set are configured such that a bit string representing one of the plurality of V-RNTIs has more than K different-value bits to be compared with other bit strings representing other V-RNTIs, where K is one or more integer.

7. A method for transmitting information for interference cancellation of a mobile station (MS), the method being performed by a base station (BS) and comprising:
configuring a restricted virtual radio network temporary identifier (V-RNTI) set including a plurality of V-RNTIs for interference signal cancellation, wherein each of the plurality of V-RNTIs is associated with one or more serving MSs;
transmitting the restricted V-RNTI set to a neighboring BS for transmission to a MS served by the neighboring BS; and
transmitting a first downlink control channel for a first serving MS and a second downlink control channel for a second serving MS in a subframe,
wherein, if the first and second serving MSs are associated with a specific V-RNTI among the plurality of V-RNTIs, only the first downlink control channel includes a single cyclic redundancy check (CRC) bit scrambled by the specific V-RNTI.

8. The method according to claim 7, wherein the restricted V-RNTI set is BS-specific.

9. The method according to claim 7, wherein the plurality of V-RNTIs of the restricted V-RNTI set are configured such that a bit string representing one of the plurality of V-RNTIs has more than K different-value bits to be compared with other bit strings representing other V-RNTIs, where K is one or more integer.

10. The method according to claim 7, wherein, if the first and second serving MSs are associated with the specific V-RNTI, the second downlink control channel includes a single CRC bit scrambled by a RNTI of the second serving MS.

11. The method according to claim 7, further comprising indicating blind decoding based on the specific V-RNTI or blind decoding based on a preconfigured cell (C)-RNTI of the serving MS to the serving MS.

12. The method according to claim 7, wherein, if the first serving MS is associated with a first V-RNTI and the second serving MS is associated with a second V-RNTI, the first V-RNTI and the second V-RNTI being included in the plurality of V-RNTIs, the first downlink control channel includes a single CRC bit scrambled by the first V-RNTI and the second downlink control channel includes a single CRC bit scrambled by the second V-RNTI.

13. A mobile station (MS) for receiving information for interference cancellation, the MS comprising:
- a radio frequency (RF) unit; and
- a processor configured to control the RF unit,
- wherein the processor is configured to:
    - receive a restricted virtual radio network temporary identifier (V-RNTI) set including a plurality of V-RNTIs for interference signal cancellation from a serving base station (BS), wherein each of the plurality of V-RNTIs is associated with one or more MSs served by a neighboring BS (hereinafter, "neighboring MSs"), and receive, from the neighboring BS, a first downlink control channel for a first neighboring MS and a second downlink control channel for a second neighboring MS in a subframe, and
    - wherein, if the first and second neighboring MSs are associated with a specific V-RNTI among the plurality of V-RNTIs, only the first downlink control channel includes a single cyclic redundancy check (CRC) bit scrambled by the specific V-RNTI.

14. A base station (BS) for transmitting information for interference cancellation, the BS comprising:
- a radio frequency (RF) unit; and
- a processor configured to control the RF unit,
- wherein the processor is configured to:
    - configure a restricted virtual radio network temporary identifier (V-RNTI) set including a plurality of V-RNTIs for interference signal cancellation, wherein each of the plurality of V-RNTIs is associated with one or more serving mobile stations (MSs), transmit the restricted V-RNTI set to a neighboring BS for transmission to a MS served by the neighboring BS, and transmit a first downlink control channel for a first serving MS and a second downlink control channel for a second serving MS in a subframe, and
- wherein, if the first and second serving MSs are associated with a specific V-RNTI among the plurality of V-RNTIs only the first downlink control channel includes a single cyclic redundancy check (CRC) bit scrambled by the specific V-RNTI.

* * * * *